A. ANDERSON.
CIRCULAR SAWING MACHINE.
APPLICATION FILED MAY 9, 1908.

945,436.

Patented Jan. 4, 1910.
2 SHEETS—SHEET 1.

Witnesses:

Inventor
Aron Anderson
by Frank D. Thomason
atty

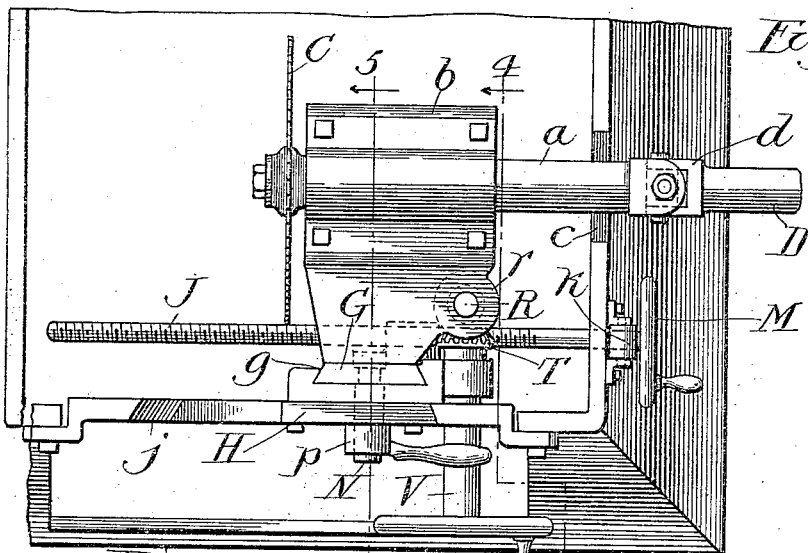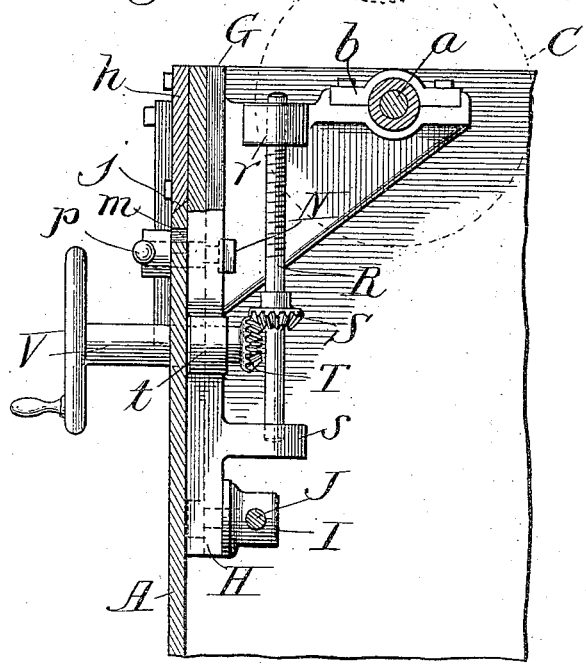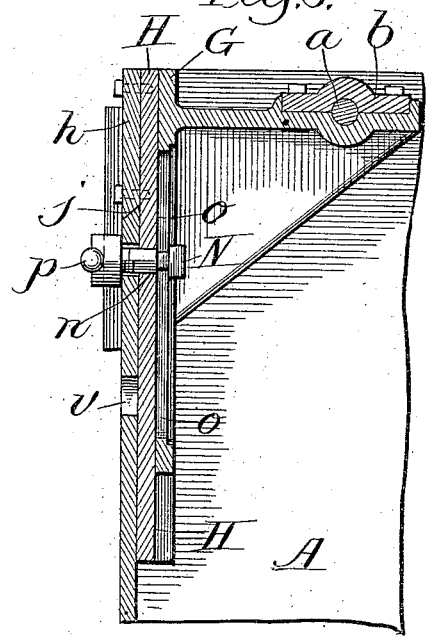

UNITED STATES PATENT OFFICE.

ARON ANDERSON, OF CHICAGO, ILLINOIS.

CIRCULAR SAWING MACHINE.

945,436.　　　　　Specification of Letters Patent.　　　Patented Jan. 4, 1910.

Application filed May 9, 1908.　Serial No. 431,824.

*To all whom it may concern:*

Be it known that I, ARON ANDERSON, a citizen of the United States, and a resident of Chicago, in the county of Cook and State of Illinois, have invented certain new and useful Improvements in Circular Sawing Machines, of which the following is a clear, full, and exact description.

My invention relates to circular sawing machines, and its object is to enable the saw to be adjusted so that it can cut at any angle within a segment of forty-five degrees, at one extreme of which it will be perpendicular.

Another object is to accomplish this adjustment by means which can be conveniently manipulated from the outside of the stand or support of said saw and its actuating mechanism, and yet another object is to enable the drive-shaft of the machine either to aline with the axis of the saw itself or an angle thereto according as it may be convenient to communicate motion from the line shafting thereto. This I accomplish by the means hereinafter fully described, and as particularly pointed out in the claims.

Figure 1:
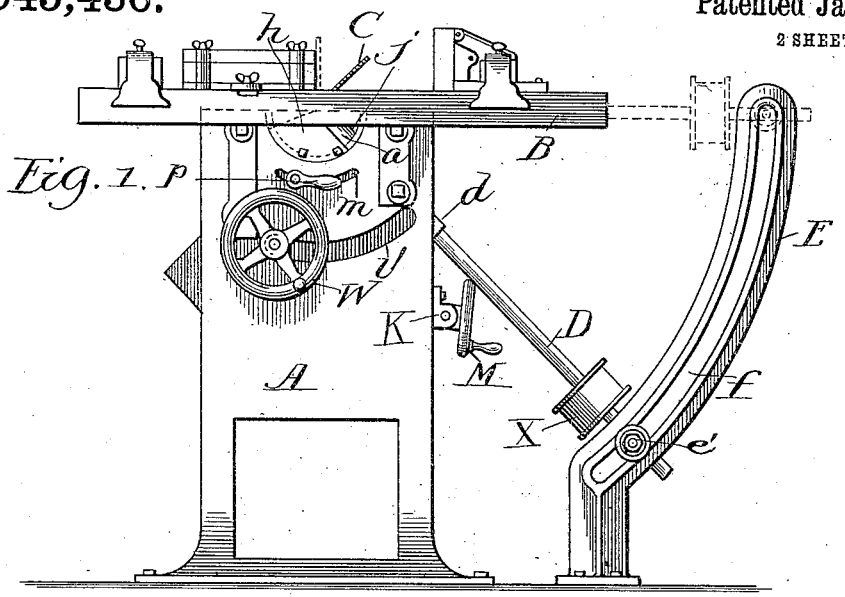
Figure 2:
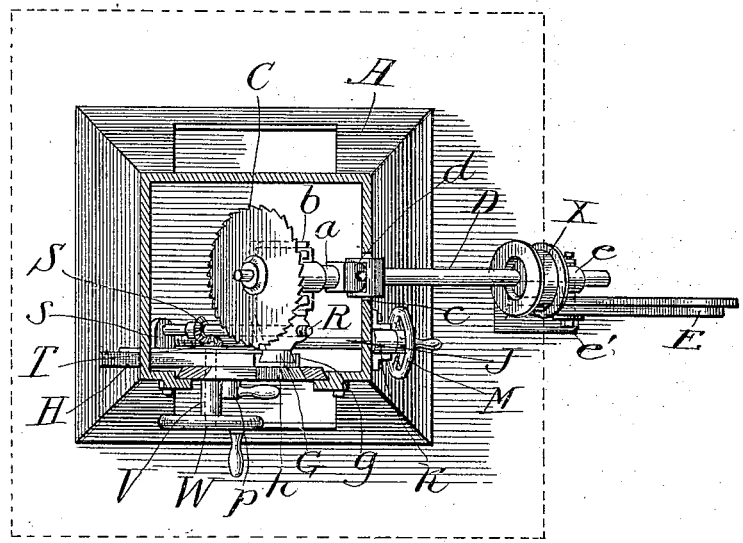

In the drawings:—Figure 1 is a front elevation of my invention. Fig. 2 is a horizontal section taken in a plane just below the top of the machine, showing the saw adjusted to cut at an angle to the perpendicular. Fig. 3 is a similar view of a portion of the machine, drawn to a slightly larger scale, and showing the saw in position to cut in a perpendicular plane. Fig. 4 is a vertical section of a fragment of the machine taken on dotted line 4—4, Fig. 3, showing the saw in dotted lines. Fig. 5 is a similar view taken on dotted line 5—5, Fig. 3.

In the drawings A represents a suitable hollow base or supporting-stand, which is, preferably, rectangular in cross-section, and B represents a top or bed, the edges of which overhang the sides of the supporting-stand, which is provided with a suitable longitudinal slot at or near the center thereof for the circular saw C to project up through, and is provided with suitable gage-plates and devices for adjusting and guiding the work to the saw, to which I make no claim herein to inventorship.

The saw C is secured by a suitable arbor to the end of a shaft $a$, that is journaled in bearings in the end of a bracket $b$, and this shaft extends to and terminates about in a vertical slot $c$ in the side-wall of the supporting-stand and is connected by a universal joint $d$, with a drive-shaft D. This latter shaft is, mechanically speaking, an extension of shaft $a$, and its outer end extends to and is journaled in bearings $e$, that have a laterally projecting portion entering a segmental slot $f$ in a segmental-frame E, and are adjustably retained therein, in such position as it may be desired to place it, by means of a set-screw and washer $e'$, so as to set shaft D at any angle, within the limits of said segmental slot, to shaft $a$ desired. Between said segmental-frame E and the supporting-stand of the machine shaft D is provided with a pulley X, through the medium of which it is connected by a suitable belt with the line shafting of the shop and driven thereby.

Bracket $b$ is secured to and projects in a vertical plane at right angles to shaft $a$, from a vertically disposed plate G the side edges of which are beveled and enter and are adjustable longitudinally in a vertical dovetail slot $g$ in the inner surface of a vertically disposed rectangular frame H, which latter is placed flat against the inner vertical surface of the front wall of the supporting-stand, and is swung from a point intersected by an imaginary horizontal longitudinal line striking transaxially through the axis of the saw. The suspension of frame H is accomplished by means of a segmental pivot-plate $h$, which is secured to the surface of frame H next the front-wall of the supporting-stand so that its upper edge is in the same plane as the top of the bracket, and which enters a semicircular opening $j$ in said wall immediately under the bed of the machine, and has its undercut beveled edges engaged with and seated on the outwardly beveled edges of said opening.

Frame H has a pivoted head I secured to the inner surface of the lower portion thereof, and this head is engaged by a screw-threaded transverse shaft J, whose outer end extends through a suitable opening in the same side-wall through which shaft $a$ extends, and through a rocking bearing block $k$, that permits said shaft to adjust itself to the position of the frame H, and at the same time prevents longitudinal movement thereof. The outer end of this shaft has a hand-wheel M secured thereto, and by turning this wheel the frame is swung to the proper inclination to adjust the saw at the angle desired. In order to make frame H more rigid, and prevent any vibration thereof, I make, in the front-wall of the supporting-stand just below opening *j*, a segmental slot *m*, the curvature of which is struck from the same center as opening *j*, and extending therethrough is a bolt N, the inner smooth portion of the barrel of which extends through a suitable opening *n* in frame H and a vertically elongated or longitudinal slot *o* in plate G of the bracket, and its inner end is provided with a head of greater diameter than the width of said slot. The outer end of this bolt is screw-threaded and has a nut *p* (from which a handle projects) engaging the same. By turning this nut, plate G and frame H are clamped against the front-wall of the supporting-stand. Where the bolt passes through slot *o*, it is reduced in diameter to accommodate the narrowness of the slot, and is, preferably, squared therein to prevent its turning, when nut *p* is turned.

Bracket *b* is provided, near its top, with a laterally projecting lug *r*, which has a vertical screw-threaded opening therein, and near its lower end frame H is provided with a lug *s*, which has a bearing therein, the axis of which alines with that of the screw-threaded opening of lug *r*, for the heel of a vertical shaft R, the upper screw-threaded portion of which engages the opening in lug *r*. This vertical shaft R is turned so as to adjust the bracket and the saw carried thereby, up and down, by means of a miter gear S thereon; a companion gear T engaging the same, and a short horizontal shaft V on whose inner end gear T is secured. Shaft V is journaled in suitable bearings *t* in frame H, and extends out through a segmental slot *v* in the front wall of the supporting-stand below slot *m*, and is provided with a hand-wheel W on its outer end with which to turn it.

Thus it will be observed that the adjustment of the saw to any angle desired, within certain practical limits, or up and down, according as may be deemed necessary, is easily and quickly accomplished and that vibration of the saw is effectually prevented.

What I claim as new is:—

1. The combination of a saw-shaft consisting of two sections connected by a universal joint near the saw end, with a vertically and angularly adjustable bearing, and an independent bearing for the opposite end of said shaft in which such shaft is longitudinally slidable, said bearing being adjustable on an arc struck from the center of angular adjustment of the other bearing.

2. The combination of a saw-shaft consisting of two sections connected by a universal joint near the saw end, with a vertically adjustable bearing that is pivoted transaxially, and an independent bearing for the opposite end of said shaft in which such shaft is longitudinally slidable, said bearing being adjustable on an arc struck from the center of angular adjustment of the other bearing.

3. The combination of a saw-shaft consisting of two sections connected by a universal joint, an angularly adjustable bearing for the saw-end of said shaft including a vertically adjustable bracket, and an independent bearing for the opposite end of said shaft in which such shaft is longitudinally slidable, said bearing being adjustable on an arc struck from the center of angular adjustment of the other bearing.

4. The combination of a saw-shaft consisting of two sections connected by a universal joint, a bearing for the saw-end of said shaft including a vertically adjustable bracket, and a pivotal frame on which the same is mounted, and an independent bearing for the opposite end of said shaft in which such shaft is longitudinally slidable, said bearing being adjustable on an arc struck from the center of angular adjustment of the other bearing.

5. The combination of a saw-shaft consisting of two sections connected by a universal joint, a bearing for the saw-end of said shaft including a vertically adjustable bracket and a frame pivoted at its upper end on which the same is mounted, and an independent bearing for the opposite end of said shaft in which such shaft is longitudinally slidable, said bearing being adjustable on an arc struck from the center of angular adjustment of the other bearing.

In testimony whereof I have hereunto set my hand this 4th day of May, A. D., 1908.

ARON ANDERSON.

Witnesses:
FRANK D. THOMASON,
E. K. LUNDY.